Jan. 6, 1931.  H. WETTSTEIN  1,788,218

HELICOPTER

Filed Dec. 13, 1928  2 Sheets-Sheet 1

INVENTOR

Henry Wettstein.

Jan. 6, 1931.   H. WETTSTEIN   1,788,218
HELICOPTER
Filed Dec. 13, 1928   2 Sheets-Sheet 2

INVENTOR
Henry Wettstein

Patented Jan. 6, 1931

1,788,218

UNITED STATES PATENT OFFICE

HENRY WETTSTEIN, OF NEW YORK, N. Y.

HELICOPTER

Application filed December 13, 1928. Serial No. 325,693.

This invention relates to flying machines of the helicopter type. The construction herein described enables this machine to fly in a vertical as well as horizontal direction, to remain stationary in the air, to move sidewise and backwards to some extent, and to turn around a vertical axis. Moreover, it is so designed to have a good degree of stability in the air, and to be easily controllable by a simple and very effective method.

The various features of my invention are illustrated in the accompanying drawings, in which Fig. 1 is a plan view of my helicopter;

Figure 1:
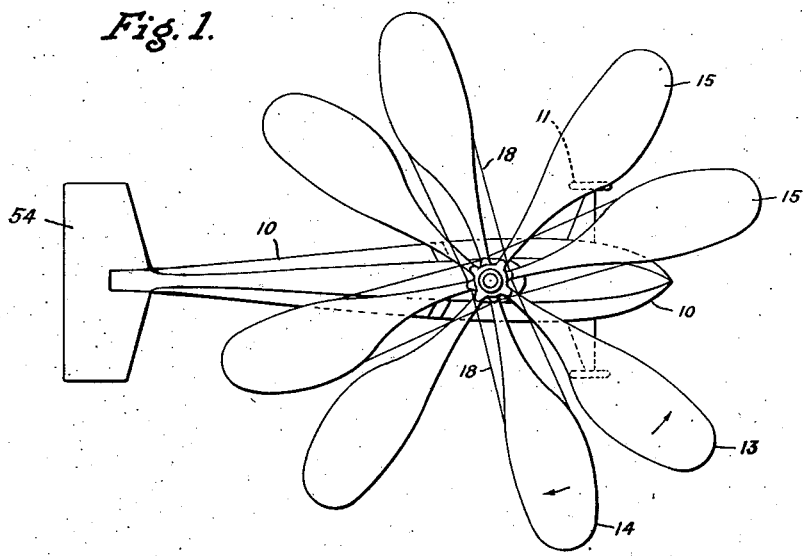
Figure 2:
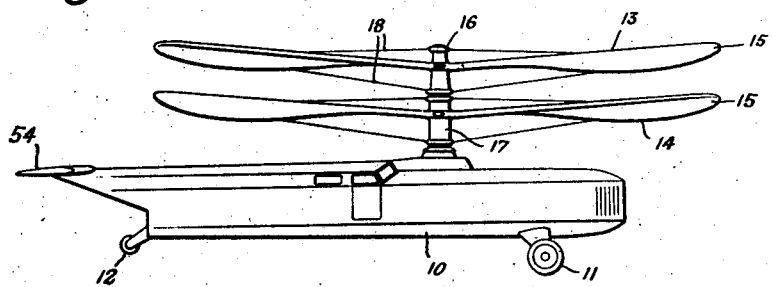
Fig. 2 is a side elevation of same.

In these drawings, numeral 10 designates the body or fuselage of the helicopter, having landing gear 11 and 12 attached thereto. 13 and 14 are the two co-axial lifting propellers. They are of opposite pitch and rotate in opposite directions. They consists of a number of blades 15, which are rigidly mounted upon tubular spindles 16 and 17 respectively. Suitable wires or cables 18 may be used to strengthen the propeller structures.

The inner spindle 16 on which the upper propeller 13 is mounted, is rotatably supported within the outer spindle 17 by a bearing 19, preferably a ball or roller bearing. Spindle 17 is supported in the fuselage 10 by a universal suspension bearing 20. This bearing is constructed in the well known manner, consisting of two ring shaped members 21 and 22, pivotally connected at 23. The inner ring 21 is rotatably mounted on the spindle 17, and the outer ring 22 is pivotally connected to the fuselage 10 of the helicopter at 24.

Thus, while the two propellers are fixedly supported against axial movement, they are free to rotate; and the whole propeller unit may also be tilted forward, sidewise, or in any other direction around a point in the center of the suspension bearing 20.

By means of this tilting arrangement of the propellers the helicopter is controlled. If the propeller axis is in a vertical position, and the center of gravity of the whole machine lies in the propeller axis, the helicopter will evidently remain stationary in the air or rise or descend vertically. In order to move the helicopter in a horizontal direction, it is only necessary to incline the propellers in the respective direction. This will create a horizontal component of the lifting force which will move the ship in the desired direction. Forward flying is also achieved by simply tilting the propellers forward.

For the drive of the propellers I have shown in the drawings a steam power plant. A steam engine 25, preferably with radially arranged cylinders, is attached to the lower end of the propeller spindle 17; and the crank shaft 26 of the engine is connected directly to the spindle 16. In operation the housing of the engine 25 would then rotate in opposite direction as the crank shaft 26. This method of driving the propellers has the advantage that the propellers will be able to adjust their speeds relative to each other; furthermore, by this drive there will be no turning moment created on the fuselage. The fuselage is free to turn like a weather cock; a feature which is of importance for the stability of the ship.

The steam for the engine is furnished by a boiler 27, and is conducted to the engine through a flexible pipe 28 and a coupling joint 29 which is rotatably carried on the engine. The exhaust steam from the engine passes through another orifice in the coupling joint 29, through another flexible pipe connection 30 to a condenser, not shown in the drawings. From there the condensed water is fed back to the boiler.

It is clear that various other forms of driving arrangements could be employed in my helicopter without changing the principle of my invention. For instance a gas engine and compressor unit could be substituted for the boiler. The engine 25 would then be substantially the same, but would be driven by compressed air or other pressure fluid. Or, a gas engine could be mounted directly on the propeller spindle 17 in similar fashion as the steam engine, but having the crank shaft connected to spindle 16 by reduction gears. As a further possibility an engine could also be mounted in the fuselage, to drive the propellers through a suitable mechanical transmission mechanism.

For tilting the propellers I prefer to use a tilting apparatus which employs auxiliary power in order to facilitate a quick and easy operation. This tilting apparatus consists of two cylinders 31 and 32, having pistons 33. The cylinders, set at about right angles to each other, are attached to the fuselage 10 at 34 and 35; and the pistons are pivotally connected to a collar 36, rotatably mounted on the lower end of the propeller unit. The pistons are operated by steam or hydraulic pressure; and in order to tilt the propellers in any direction, the pilot of the craft simply moves a control lever 37 in the desired direction. This lever is mounted in a ball socket bearing 38, and connected by two links 39 to the valves 40 and 41. These valves are also set at right angles to each other, and admit the pressure to the respective cylinders through the connecting pipes 42.

Figure 3:
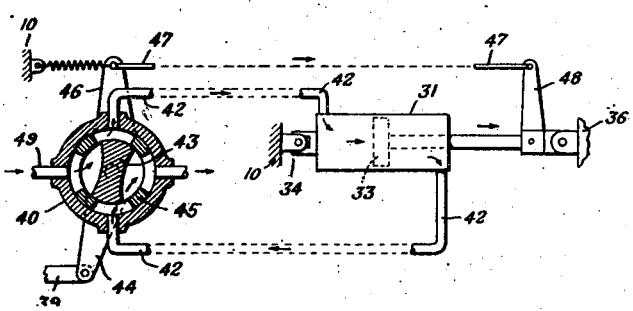
Fig. 3 is a detail view of the control apparatus.
Figure 4:
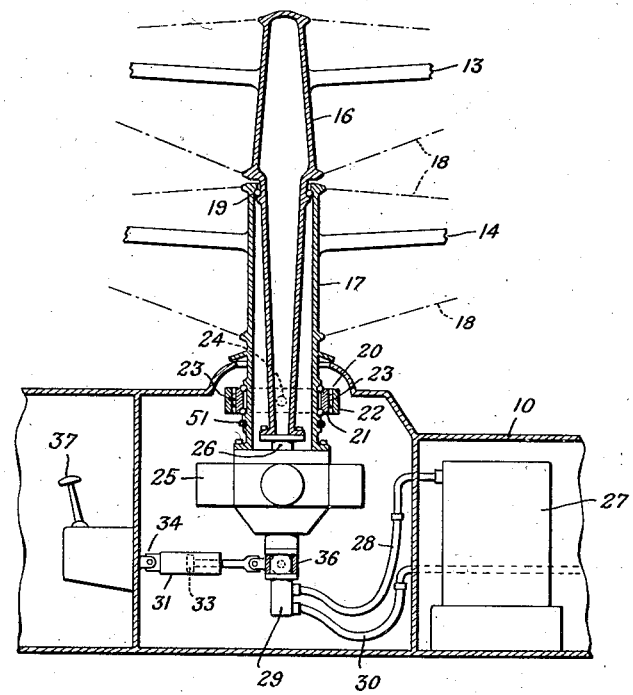
Fig. 4 is a fragmentary vertical sectional view of the helicopter.
Figure 5:
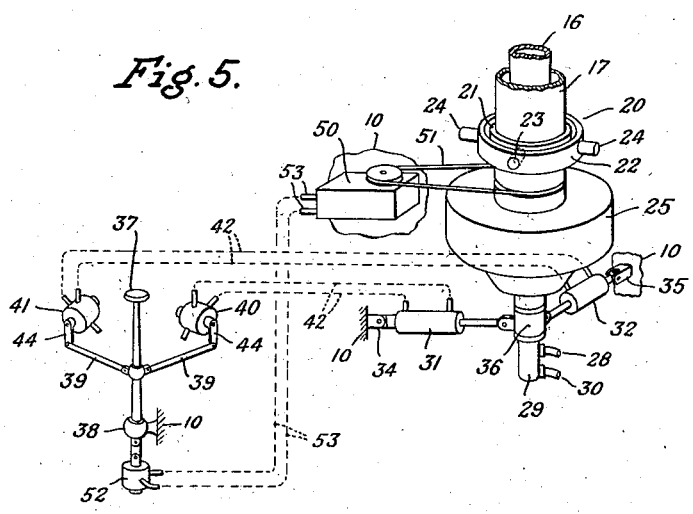
Fig. 5 is a perspective diagrammatical view of the control apparatus of this helicopter.

In order to produce just the desired degree of propeller tilting from a given tilting of the control lever 37, a well known method is employed which is shown in more details in Fig. 3. The valves 40 and 41 have each an inner valve member 43 with a lever 44 integral therewith and connected by the links 39 to the control lever 37. Around this member 43 is a sleeve 45 with a lever 46 attached to it. This lever is connected by a cable or link 47 to the projection 48 which is integral with the piston 33. In Fig. 3 the inner valve member 43 is shown in such a position that the pressure supplied by pipe 49 will pass through the valve ports and through a pipe 42 to the cylinder 31. The piston 33 will therefore move towards the right. But by means of the link connections 47 the sleeve member 45 of the valve will be turned in a clockwise direction until the port holes in the valve are closed again, and the piston comes therefore to a stand still at a desired point.

Thus, if the parts are suitably arranged, it may be seen that when the control lever 37 is tilted in any direction, the propeller unit will immediately be tilted also in the same direction and to a degree proportionate to the degree that the control lever is tilted.

It can readily be seen also that the same results can be obtained, if the valves and cylinders are omitted entirely, and the links 39 of the control lever are connected directly through cables or other means to the collar 36 of the propeller unit. Such a direct operation may be used on small machines where it will require less exertion to tilt the propellers.

For making right and left hand turns during forward flying an ordinary airplane rudder could evidently be used in this helicopter. But such a rudder would be useless in vertical and in stationary flying. I have therefore omitted the rudder entirely in my design, and use in its place a rudder mechanism which will be effective in all conditions of flying.

This mechanism consists of a small auxiliary engine 50, mounted in the fuselage, and connected to the outer propeller spindle 17 by a belt drive 51 or other suitable means. This engine can run in either direction, and is controlled by a valve 52 through pipe connections 53. The valve 52 is operated directly by the control lever 37. In straight flying the engine 50 would simply idle, driven by the spindle 17; but if the knob of the control lever 37 and thereby the valve 52 is rotated, the engine 50 will then create a torque between the fuselage 10 and propeller spindle 17; and this torque will cause the fuselage to turn in the desired direction.

A horizontal tail plane 54 is provided mainly for reasons of stability in forward flying.

Claims:

1. A helicopter comprising a body, two lifting propellers rotating in opposite directions on a common axis, means for tilting said propellers relative to the body of the helicopter and means for suspending said body for free pivotal movement independently of said tilting means under the influence of wind stresses.

2. A helicopter having two lifting propellers rotating in opposite directions on a common axis, and being controlled by tilting said propellers relative to the body of the helicopter, auxiliary mechanical means for effecting said tilting, and means for freely suspending the body from the propellers whereby said body tends to head automatically into the wind.

3. A helicopter having two co-axial lifting propellers rotating in opposite directions, a body suspended therefrom, said propellers being tiltable in all directions relative to said body, pistons for effecting the said tilting, a manually operated control lever, valves for controlling the operation of said pistons, and means for operatively connecting the lever to the valves.

4. A helicopter, having two lifting propellers rotating in opposite directions on a common and substantially vertical axis, an engine for rotating said propellers, a fuselage and a universal joint for suspending said fuselage from said propellers, said fuselage being free to rotate automatically around said axis independently of the rotation of said propellers under the influence of wind pressure.

5. A helicopter, having two co-axial lifting propellers rotated in opposite directions by an engine, said propellers and engine forming a unit, a fuselage, and a universal joint for rotatably and tiltably suspending said fuselage from said unit for free rotation thereof under side wind stresses.

6. A helicopter, having two lifting propellers rotating in opposite directions on a common and substantially vertical axis, an engine for rotating said propellers, said propellers and engine forming a unit, a fuselage rotatably suspended from said unit, an auxiliary engine attached to said fuselage and geared to said unit for turning said fuselage around the said axis.

7. In a helicopter, a pair of coaxially arranged lifting propellers, a hollow shaft for one propeller, a second shaft within the hollow shaft for the other propeller, a motor directly connected to said shafts for rotating said shafts in opposite directions, and a fuselage freely suspended from said shafts, said motor, propellers and shafts being arranged nearer one end of the fuselage than the other whereby a side wind on said fuselage tends to turn the fuselage to head into the wind.

8. In a helicopter, the combination with lifting propellers, and means for driving said propellers, of a fuselage independent of said driving means and freely suspended from said propellers so that the point of suspension of said fuselage is nearer one end of the fuselage than the other, whereby said fuselage automatically adjusts itself against the direction of wind.

9. In a helicopter, two lifting propellers rotating on a common axis, forming a unit, a fuselage suspended therefrom, said fuselage being free for rotation about a vertical axis and having a comparatively long vertical tail fin whereby side winds tend to turn the fuselage into a position wherein it heads into the wind, means for tilting the propeller unit in all directions to control the horizontal movement of the helicopter, and means for applying a turning moment between said propeller unit and the fuselage for rotating said fuselage around a vertical axis.

10. A helicopter consisting substantially of two coaxially arranged lifting propellers rotating in opposite directions and forming a unit, and a fuselage suspended from said unit and freely deflectable about a vertical axis under side wind pressure put thereupon, said fuselage having a comparatively large vertical tail portion for that purpose, forward flying, movement in any horizontal direction and control of the helicopter against upsetting being obtainable by tilting the propeller unit relatively to the fuselage, and the helicopter being rotatable about a vertical axis by the application of a turning moment between the said unit and the fuselage.

Signed at New York city in the county of New York and State of New York this eleventh day of December, A. D. 1928.

HENRY WETTSTEIN